Dec. 22, 1925.
H. T. JOHNSON
WHEEL TRACK
Filed March 17, 1924
1,566,876
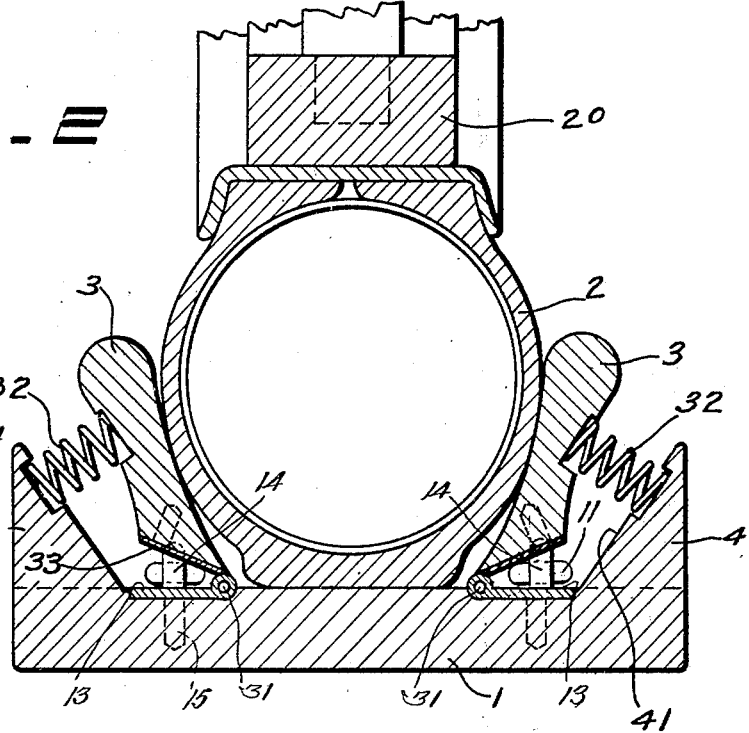
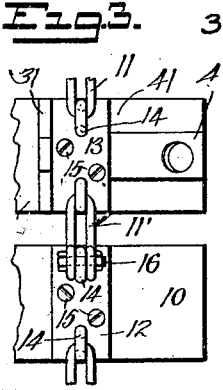
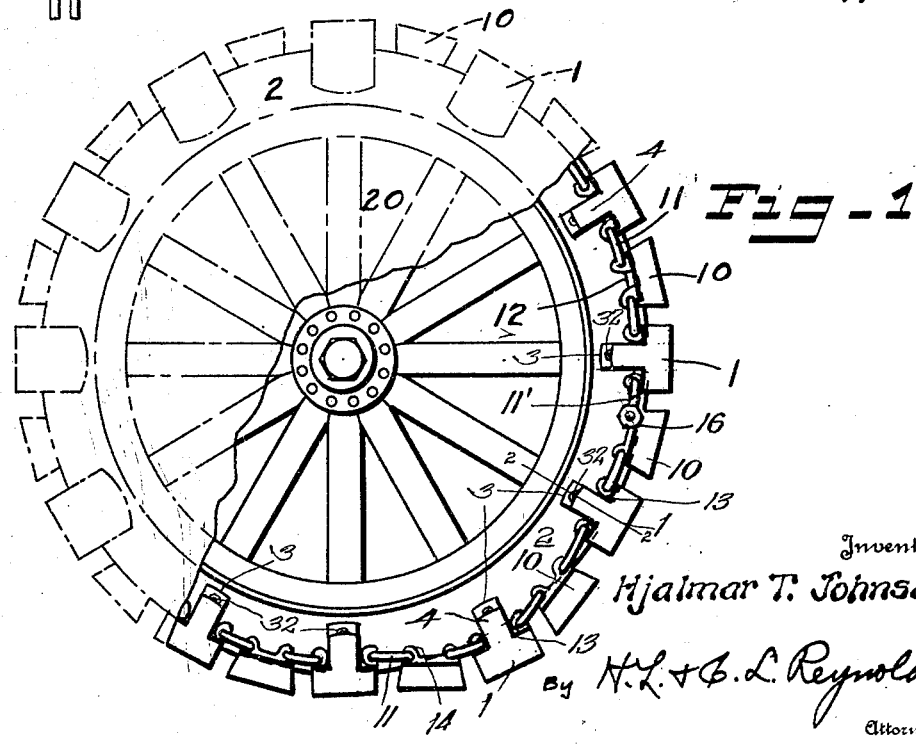
Inventor
Hjalmar T. Johnson
By H.L. & C.L. Reynolds
Attorneys Patented Dec. 22, 1925.

1,566,876

UNITED STATES PATENT OFFICE.

HJALMAR T. JOHNSON, OF SEATTLE, WASHINGTON.

WHEEL TRACK.

Application filed March 17, 1924. Serial No. 699,722.

*To all whom it may concern:*

Be it known that I, HJALMAR T. JOHNSON, a citizen of the United States of America, and resident of the city of Seattle, in the county of King and State of Washington, have invented certain new and useful Improvements in Wheel Tracks, of which the following is a specification.

My invention relates to a wheel track or tread member which is intended for application to a wheel and which is especially adapted for pneumatic tired wheels, but applicable to all types, and which is intended for assisting the vehicle through soft or sandy ground, so that it will not sink into the ground and so that it will have traction at all times, and over broken or uneven surfaces.

It is an object of my invention to provide such a device wherein the wheel and its tread are securely connected so that the wheel will not slip around inside of the tread member, and yet one in which the tread member is free to yield with inequalities of the ground, and thus to adapt itself more readily to the surface over which it runs. More especially it is my object to provide a tread member or wheel track in which the elements thereof are connected to the tire of the wheel through yieldingly held presser members, to the end that the tread is firmly secured, yet flexibly held to the wheel. It is another object to provide a tread member of the character described, which is simple and cheap.

My invention comprises those novel parts and combinations thereof which are shown in the accompanying drawings, described in the specification and particularly defined by the claims terminating the same.

In the accompanying drawings I have shown my invention in the form which is now preferred by me.

Figure 1 is a side elevation of a wheel with my device applied thereto, portions of my invention being shown in outline only.

Figure 2 is a transverse section on line 2—2 of Figure 1 through a wheel rim, tire, and tread member.

Figure 3 is a detail of corresponding ends of adjacent tread members and their connecting means, looking outward from the center of the wheel, with certain parts omitted. Essentially the device consists of a plurality of blocks 1 which extend transversely of the tire 2 of a wheel 20, these tread members or blocks being connected by suitable means to form an endless tread extending about the tire. Means are provided for preventing creeping of the device about the tire. The means connecting the several tread members 1 may conveniently be made by links 11, and 12, which, together with the links 13, form in effect an endless chain. If the blocks 1 are widely spaced there may be intermediate blocks 10 secured in the chain, as, for example, by securing them to the links 12, these differing from the blocks 1 chiefly in the omission of the tire-gripping means. It will be apparent, however, that the blocks 1 may be so closely spaced about the tire that the intermediate blocks 10 may be dispensed with. Further, it may be desirable to provide additional intermediate blocks and fewer of the main blocks 1. The number of blocks 1 in the tread is largely immaterial, being determined by the number required to satisfactorily grip the tire, by means to be described hereafter.

The links 12 and 13 are substantially alike, and comprise plates adapted to be secured to the respective blocks 10 and 1, as by screws 15, and having an eye 14 at each end through which the links 11 are passed. One link 11' is formed as a shackle, and a bolt 16 passing through the eyes therein and an eye 14 enables the ends of the tread to be separated to dismount the device when not required for use. It will be understood that the form of the several links, the manner of their connection to each other and to the blocks 1 and 10, and the manner in which the ends of the tread are disconnected, are immaterial to my invention, and that for the means disclosed herein may be substituted other means for accomplishing the desired result, without departing from the spirit or scope of my invention.

Each of the blocks 1, which has a relatively broad under or tread surface, is provided upon its upper or inner face with a pair of presser plates 3. These plates 3 are spaced at opposite sides of the median plane through the tire 2, and preferably are secured to the blocks 1, as by a hinge connection at 31 to the links 13. Preferably the hinge connection is at a point inward of the planes which include the normal outer side of the side walls of the tire 2, especially where a pneumatic tire is employed. The presser plates 3 are yieldingly urged inward toward each other and against the tire 2 by suitable means, such as the springs 32 positioned between the plates 3 and the block 1 which supports the same, or between the plates 3 and chocks 4 which are supported upon the blocks 1 outwardly of the presser plates 3 and their hinge connections 31.

These chocks 4 may form an integral part of the block 1 and are provided preferably with an inwardly directed surface 41 laterally outward of the tread of the tire 2, and facing toward the plate 3 adjacent thereto. The spring 32 may thus be positioned between the inclined face 41 of the chock 4 and the adjacent face of the presser plate 3, and pressure applied at a point well outward toward the end of the presser plate 3. This permits the use of a lighter spring than would be required if the spring were applied nearer the hinge 31.

The springs 32 permit yielding of the presser plates 3 outward as the tire 2 flexes under loads and as the block 1 yields relative to the tire in passing over uneven ground. Each block 1 and 10 is, therefore, free to yield and twist as may be necessary, thus fitting the inequalities of the ground and giving a firm traction surface, yet supporting the tire from sinking into the ground. The presser plates 3 are urged inward against the tire sufficiently to grip it to prevent displacement of the tread from the tire, yet permitting the yielding of the individual blocks 1 and 10, as has been noted. Outward pressure against the plates 3 may proceed until the plates strike either against the chocks 4 or until their bottom surface 33 engages the inner face of the block 1. The presser plates thereupon become fixed and will not yield further, yet will support the tire and the wheel above it.

What I claim as my invention is:

1. A traction device for wheels comprising a plurality of blocks connected in an endless tread, a pair of wheel-tread-engaging means supported from each block and spaced at opposite sides of the median plane of said blocks, and means yieldingly urging said tread-engaging members towards each other.

2. A traction device for wheels comprising a plurality of blocks connected in an endless tread, supporting means at each side of the median plane of said blocks, and presser means inward of each of said supporting means, and yieldingly supported therefrom.

3. A traction device for wheels comprising a plurality of transverse blocks connected in an endless tread, each of said blocks having a pair of spaced, inwardly directed chocks upon its inner face, and a side plate inward of and yieldingly supported from each chock.

4. A traction device for wheels comprising a plurality of transverse blocks flexibly connected in an endless tread, each of said blocks having a pair of spaced inwardly directed chocks upon its inner face, and a side plate secured to said block inward of each chock, and yieldingly supported therefrom.

5. A traction device for wheels comprising a plurality of transverse blocks connected in an endless tread, a pair of spaced chocks upon the inner face of each of said blocks, each of said chocks having an inwardly directed face, a side plate hinged by one end to each of said blocks inward of and adjacent to each of said chocks, and a spring interposed between the inclined face of each chock and its side plate to yieldingly support the plate from the chock.

6. A traction device for pneumatic-tired wheels, comprising a plurality of blocks, means connecting said blocks in an endless tread about said tire, a pair of side plates secured to each of said blocks upon opposite sides of the median plane of said tire and inward of the planes normally including the side walls of said tire, and means yieldingly pressing said plates inward against the tire.

7. A traction device for pneumatic-tired wheels, comprising a plurality of blocks, means connecting said blocks in an endless tread about said tire, a pair of side plates supported from each of said blocks and positioned upon opposite sides of the tire, and means yieldingly pressing said plates inward against the tire.

Signed at Seattle, King County, Washington, this 6th day of March, 1924.

HJALMAR T. JOHNSON.